US011152757B2

(12) United States Patent
Hodgson et al.

(10) Patent No.: US 11,152,757 B2
(45) Date of Patent: Oct. 19, 2021

(54) HIGH REPETITION RATE SEED LASER

(71) Applicant: Coherent, Inc., Santa Clara, CA (US)

(72) Inventors: Norman Hodgson, Belmont, CA (US); Dmitri Simanovski, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 39 days.

(21) Appl. No.: 16/434,080

(22) Filed: Jun. 6, 2019

(65) Prior Publication Data
US 2020/0388983 A1 Dec. 10, 2020

(51) Int. Cl.
*H01S 3/11* (2006.01)
*H01S 3/067* (2006.01)
(Continued)

(52) U.S. Cl.
CPC .......... *H01S 3/1118* (2013.01); *H01S 3/0675* (2013.01); *H01S 3/06779* (2013.01); *H01S 3/08059* (2013.01); *H01S 3/1055* (2013.01); *H01S 3/10092* (2013.01); *H01S 3/1121* (2013.01)

(58) Field of Classification Search
CPC ...... H01S 3/1115; H01S 3/1118; H01S 3/105; H01S 3/1053; H01S 3/1055; H01S 3/1121; H01S 3/082–0826; H01S 3/086; H01S 3/1112–1118; H01S 3/08013; H01S 3/1303; H01S 3/067–06795
See application file for complete search history.

(56) References Cited

U.S. PATENT DOCUMENTS 5,359,612 A * 10/1994 Dennis ................ H01S 3/06791
372/18
5,414,725 A * 5/1995 Fermann ................ H01S 3/067
372/18
(Continued)

FOREIGN PATENT DOCUMENTS

| CN | 107069416 A | * | 8/2017 | |
|---|---|---|---|---|
| CN | 109412009 A | * | 3/2019 | |
| CN | 209344510 U | * | 9/2019 | |
| KR | 20070009340 A | * | 1/2007 | ............. G10L 19/02 |

OTHER PUBLICATIONS

Haus et al., "Structures for Additive Pulse Mode Locking", Optical Society of America, vol. 8, No. 10, Oct. 1991, pp. 2068-2076.
(Continued)

*Primary Examiner* — Joshua King
(74) *Attorney, Agent, or Firm* — Morrison & Foerster LLP

(57) ABSTRACT

A fiber laser producing a beam of ultrashort laser pulses at a repetition rate greater than 200 MHz includes a linear fiber resonator and a fiber branch. Ultrashort laser pulses are generated by passive mode-locking and circulate within the linear fiber resonator. Each circulating laser pulse is split into a portion that continues propagating in the linear fiber resonator and a complementary portion that propagates through the fiber branch and is then returned to the linear fiber resonator. The optical length of the linear fiber resonator is an integer multiple of the optical length of the fiber branch. The repetition rate of the ultrashort laser pulses is the reciprocal of the propagation time of the laser pulses through the fiber branch.

19 Claims, 4 Drawing Sheets

(51) Int. Cl.
*H01S 3/08* (2006.01)
*H01S 3/10* (2006.01)
*H01S 3/1055* (2006.01)

(56) References Cited

U.S. PATENT DOCUMENTS

| | | | | |
|---|---|---|---|---|
| 5,450,427 | A * | 9/1995 | Fermann | H01S 3/0675 372/10 |
| 5,999,545 | A * | 12/1999 | Jeon | H01S 3/067 372/6 |
| 7,649,915 | B2 * | 1/2010 | Fermann | H01S 3/067 372/18 |
| 2010/0296528 | A1 * | 11/2010 | Haering | H01S 3/06791 372/6 |
| 2012/0242973 | A1 | 9/2012 | Tunnermann et al. | |
| 2013/0293941 | A1 | 11/2013 | Harter et al. | |
| 2015/0357788 | A1 * | 12/2015 | Puppe | G01J 3/10 372/18 |

OTHER PUBLICATIONS

Russo et al., "High Frequency Pulse Trains from a Self-Starting Additive Pulse Mode-Locked Locked All-Fiber Laser", Optics Communications, vol. 283, 2010, pp. 113-117.

Arkhipov et al., "Pulse Repetition-Frequency Multiplication in a Coupled Cavity Passively Mode-Locked Semiconductor Lasers", Applied Physics B, vol. 118, No. 4, 2015, 10 pages.

Berger et al., "Repetition-Rate Multiplication of Optical Pulses Using Uniform Fiber Bragg Gratings", Optics Communications, vol. 221, 2003, pp. 331-335.

Leaird et al., "Generation of High-Repetition-Rate WDM Pulse Trains from an Arrayed-Waveguide Grating", IEEE Photonics Technology Letters, vol. 13, No. 3, Mar. 2001, pp. 221-223.

Petropoulos et al., "Generation of a 40-GHz Pulse Stream by Pulse Multiplication with a Sampled Fiber Bragg Grating", Optics Letters, vol. 25, No. 8, Apr. 15, 2000, pp. 521-523.

Wang et al., "Microring-Based Optical Pulse-Train Generator", Optics Express, vol. 18, No. 18, Aug. 30, 2010, pp. 19314-19323.

* cited by examiner

HIGH REPETITION RATE SEED LASER

TECHNICAL FIELD OF THE INVENTION

The present invention relates in general to master-oscillator power-amplifier (MOPA) laser systems. The invention relates in particular to master-oscillators producing ultrashort seed pulses at repetition rates of greater than 200 megahertz.

DISCUSSION OF BACKGROUND ART

Beams of ultrashort laser pulses are increasingly used for cutting and drilling a wide range of materials including metals, glasses, and polymers. Traditional mechanical processing produces rough surfaces and unwanted defects, such as micro cracks, which may propagate when a processed workpiece is stressed. These defects thereby degrade and weaken the processed workpiece. Laser material processing using a focused beam of ultrashort laser pulses produces more precise cuts and holes, which have higher-quality edges and walls. Laser processing minimizes the formation of unwanted defects and causes a smaller heat-affected zone (HAZ). High energy pulses enable parallel processing, whereby a beam of ultrashort pulses is split into a plurality of beams that are directed to different work stations.

At present, pulsed master-oscillator power-amplifier (MOPA) laser systems used in industrial processing applications generate output pulses having pulse repetition rates of up to several megahertz with up to millijoule pulse energies. A MOPA includes a master-oscillator arranged to deliver seed pulses to a power-amplifier. Mode locking is a method to obtain ultrashort seed pulses at ultrafast repetition rates from a master-oscillator. The master-oscillator contains a gain medium having a large spectral bandwidth and an optical element that provides modulation of the cavity quality with a period equal to the round-trip time. This optical element could be a passive one, based on the nonlinear properties of an optical material, or an active one, such as an electrically driven optical modulator. Active mode-locking can be used to generate picosecond pulses, while passive mode-locking also allows for generation of much shorter femtosecond pulses. Passive mode-locking uses nonlinear effects such as Kerr lensing, nonlinear polarization evolution, or saturable absorption. The temporal separation of the pulses emitted by the master-oscillator is determined by the oscillator round-trip time.

Ultrafast fiber MOPAs offer the advantage of high single-mode output powers, independent selection of pulse repetition rates and pulse durations, and access to high repetition rates of up to the repetition rate of the master-oscillator. Master-oscillators typically operate at about 40-80 megahertz (MHz), where the repetition rate is inversely proportional to the optical length of the oscillator. For an 80 MHz repetition rate, the optical length is about 1.87 m. For a series of optical components, the optical length of the series is the sum of the optical lengths of the individual components, which is the geometrical length of each component multiplied by the refractive index of the component.

The power-amplifier increases the energy of the seed pulses to a desired energy for an application. The seed pulses to be amplified may be selected by a device located between the master-oscillator and the power-amplifier, commonly referred to by practitioners of the art as a pulse-picker, which typically includes an acousto-optic modulator. To achieve the amplified pulse energies necessary for material processing, a pulse picker is often used to reduce the pulse repetition rate of the seed pulses that are amplified. The duration of the ultrashort seed pulses to be amplified may be temporally extended by a wavelength dispersive device, commonly referred to as a pulse-stretcher, and then compressed again after amplification. The shortest compressed pulse duration is usually limited by the spectral bandwidth of the gain medium.

For ultrafast laser ablation, which is the interaction that the majority of ultrafast material processing applications are based on, the processing efficiency can be substantially increased by using bursts of laser pulses having repetition rates in the range of 40-80 MHz. The corresponding temporal separation of pulses within each burst is in the range of tens of nanoseconds. Typically, each burst has between about 3 and 30 pulses and the bursts have repetition rates in the range of 500 kilohertz (kHz) to several megahertz. This burst operation leads to increased ablation rates that are only a factor three to four lower compared to the known higher ablation rates of lasers emitting pulses having durations of tens of nanoseconds, while maintaining a smaller heat affected zone.

By using repetition rates of the pulses in the burst of several hundred megahertz to several gigahertz, a further increase of the ablation rates of ultrashort pulse lasers to values that are similar to the ones for nanosecond lasers can be achieved. This type of operation, however, requires a master-oscillator that is operating at repetition rates of up to several gigahertz. This is technically very challenging for a fiber oscillator, as the total geometrical length of the oscillator has to be less than about 100 millimeters (mm) for a repetition rate of 1 gigahertz (GHz), and less than 50 mm for a repetition rate of 2 GHz, which does not leave much space to incorporate all the essential oscillator components.

There is need for a master-oscillator that generates ultrashort pulses at repetition rates higher than 200 MHz and with sufficient pulse energy to seed a power-amplifier. Preferably, this master-oscillator would achieve these high repetition rates without compromising other performance characteristics and without adding significant cost.

SUMMARY OF THE INVENTION

In one aspect, a mode-locked fiber laser in accordance with the present invention comprises a gain fiber, a pump laser, a semiconductor saturable absorber mirror (SESAM), an output coupling mirror, and a beam splitter. The pump laser and the gain fiber are optically coupled. The pump laser generates a pump laser beam that energizes the gain fiber. The energized gain fiber is located between the SESAM and the output coupling mirror. The SESAM and the output coupling mirror define each end of a linear fiber laser resonator. The fiber laser resonator has an optical length L and generates a mode-locked laser beam. The beam splitter is located in the fiber laser resonator. The beam splitter is configured and arranged such that the mode-locked laser beam propagating in a direction is split into first and second portions. The first portion continues to propagate in the fiber laser resonator. The second portion propagates in a fiber branch. The second portion returns to the fiber laser resonator through the beam splitter after propagating in the fiber branch. The second portion propagates over an optical length B between splitting and next propagating through the beam splitter in the same direction. The optical length L is an integer multiple of optical length B.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
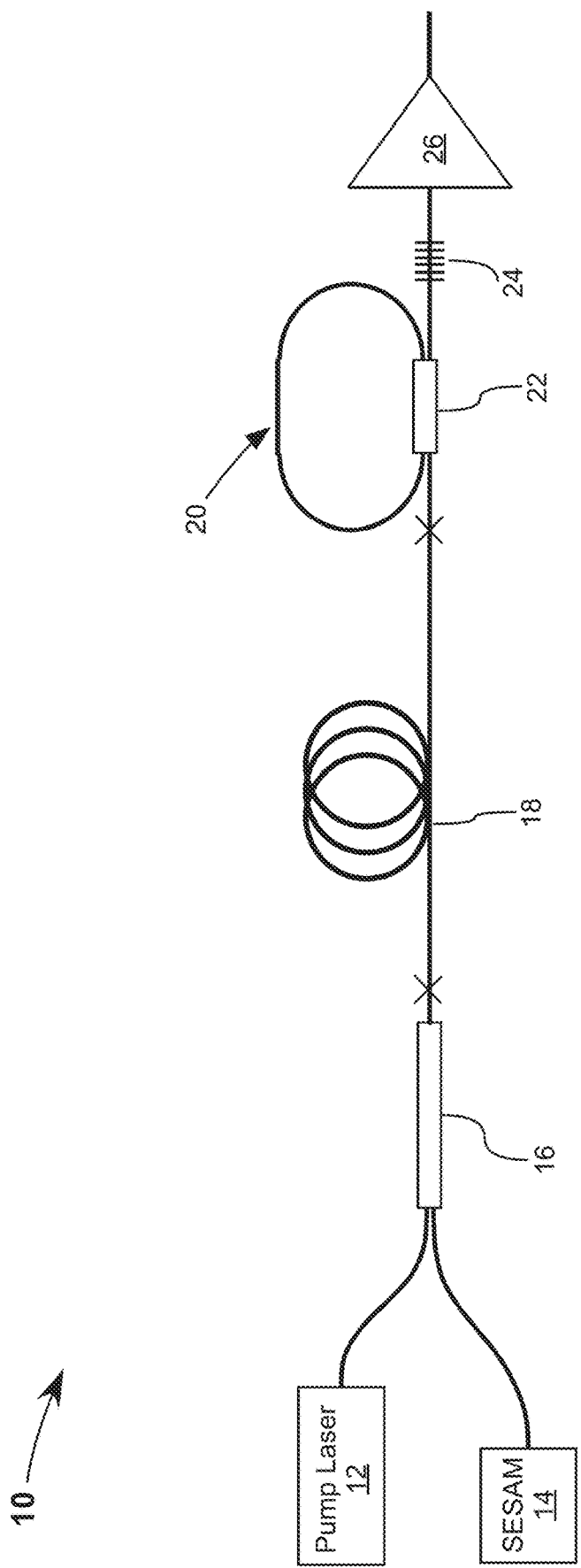
FIG. 1 schematically illustrates one embodiment of an ultrafast fiber laser according to the present invention, including a linear fiber laser resonator and a fiber branch that both have fixed optical lengths.

Referring now to the drawings, wherein like components are designated by like numerals. FIG. 1 schematically illustrates one embodiment of ultrafast mode-locked fiber laser 10 according to the present invention. A pump laser 12 emitting a pump laser beam and a gain fiber 18 are optically coupled such that the pump laser beam energizes gain fiber 18. Each end of gain fiber 18 is indicated by a splice X. By way of example, gain fiber 18 could be a ytterbium ($Yb^{3+}$) or neodymium ($Nd^{3+}$) doped optical fiber. Energized gain fiber 18 is located between a semiconductor saturable absorber mirror (SESAM) 14 and an output coupling mirror 24. The output coupling mirror 24 maybe a fiber Bragg grating mirror. A pump coupler 16 is optically coupled to the pump laser 12, SESAM 14, and an end of gain fiber 18. The pump coupler 16 may be a wavelength division multiplexer (WDM).

The SESAM 14 and the output coupling mirror 24 define each end of a linear fiber laser resonator. The fiber laser resonator has an optical length L and generates a mode-locked laser beam with a repetition rate of $c/2L$, where c is the speed of light in a vacuum. The output coupling mirror 24 may be optically coupled to a power-amplifier 26, with fiber laser 10 delivering a mode-locked laser beam through output coupling mirror 24 to power-amplifier 26, for further amplification.

A beam splitter 22 positioned in the fiber laser resonator is configured and arranged such that the mode-locked laser beam travelling in the beam splitter is split into first and second portions. The first portion continues to propagate in the fiber laser resonator. The second portion propagates in a fiber branch 20 and then returns to the fiber laser resonator through the beam splitter. The second portion propagates in the fiber branch 20 from a port at one end of beam splitter 22 to another port at the other end of beam splitter 22. Here, fiber branch 20 is an optical fiber. Beam splitter 22 maybe a 2×2 50:50 beam splitter, as depicted, or a pair of 2×1 50:50 beam splitters. The mode-locked laser beam may be propagating in either direction in the fiber laser resonator when split by beam splitter 22. The second portion continues propagating in the same direction after returning to the fiber resonator.

The second portion propagates over an optical length B between splitting in beam splitter 22 and next propagating through the beam splitter. Fiber laser 10 is configured and arranged such that the optical length L is an integer multiple m of the optical length B. The integer multiple m is preferably in a range between 2 and 40. The integer multiple m is more preferably in a range between 10 and 20. Overall, the repetition rate of the fiber laser is increased by this integer multiple. Equivalently, the mode-locked output laser beam transmitted through the output coupling mirror 24 has a pulse repetition rate equal to the reciprocal of the propagation time over optical length B. For example, a fiber branch having an optical length of 1.5 m, which is equivalent to a fused silica optical fiber having a geometric length of about 1.03 m, is necessary to achieve a pulse repetition rate of 200 MHz at a wavelength of about 1.0 micrometer. It is straightforward to fabricate the inventive fiber laser to achieve repetition rates greater than 200 MHz, which are desirable for ablative material processing. Repetition rates of up to 1.6 GHz can be achieved with sufficient output pulse energy to seed a power-amplifier. This compares to repetition rates for typical ultrafast fiber MOPA of about 40-80 MHz.

The condition $L=m B$ is critical for mode-locked operation of the inventive ultrafast fiber laser. A mode-locked pulse circulating in the fiber laser resonator is split into a first portion and a second portion by beam splitter 22. When the second portion of the pulse is returned to the fiber laser resonator after propagating in the fiber branch, it will be synchronous with all of the mode-locked pulses circulating in the fiber laser resonator. In steady-state operation, the circulating mode-locked pulses are equally separated, by a time equal to the propagation time through the fiber branch. The splitting of a circulating pulse, propagation of the second portion through the fiber branch, and returning of the second portion to the fiber laser resonator effectively transfers energy from the circulating pulse to the following circulating pulse. This continuous splitting, propagation, and returning distributes the total energy circulating in the resonator among all of the circulating pulses.

Figure 2:
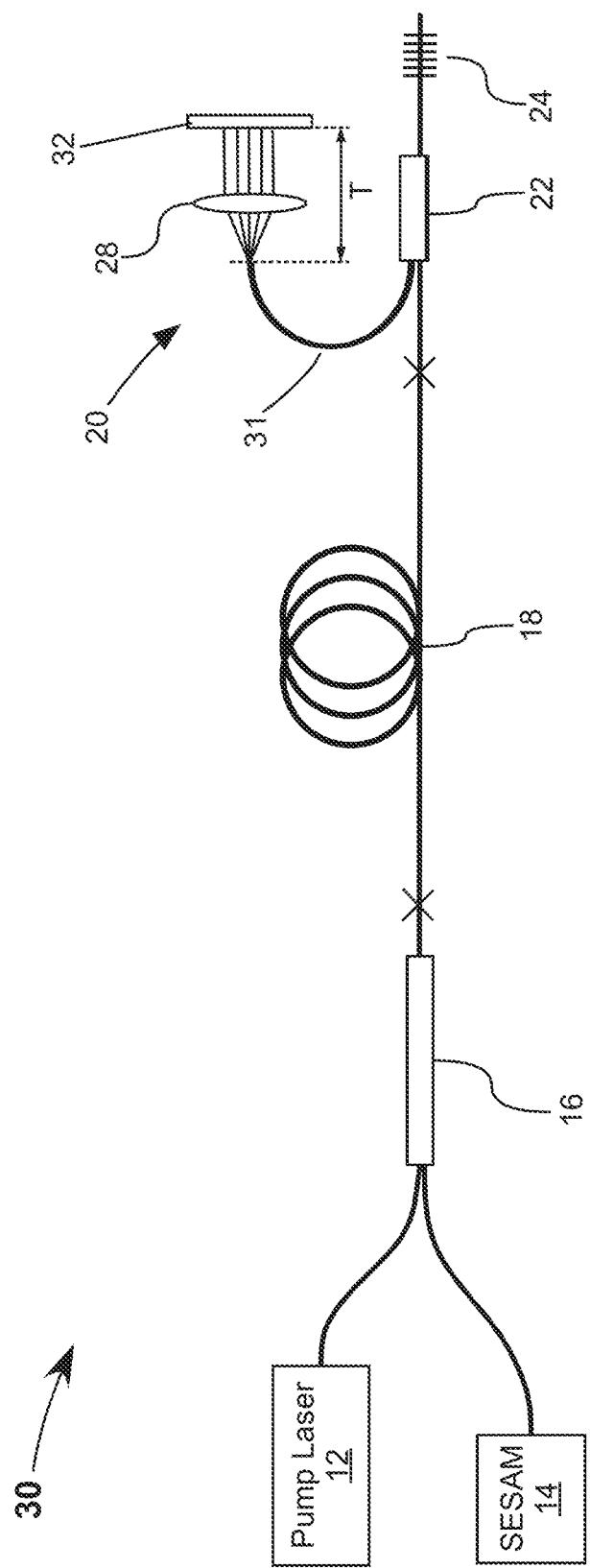
FIG. 2 schematically illustrates another embodiment of an ultrafast fiber laser according to the present invention, similar to the fiber laser of FIG. 1, but the fiber branch has an adjustable optical length.
Figure 3:
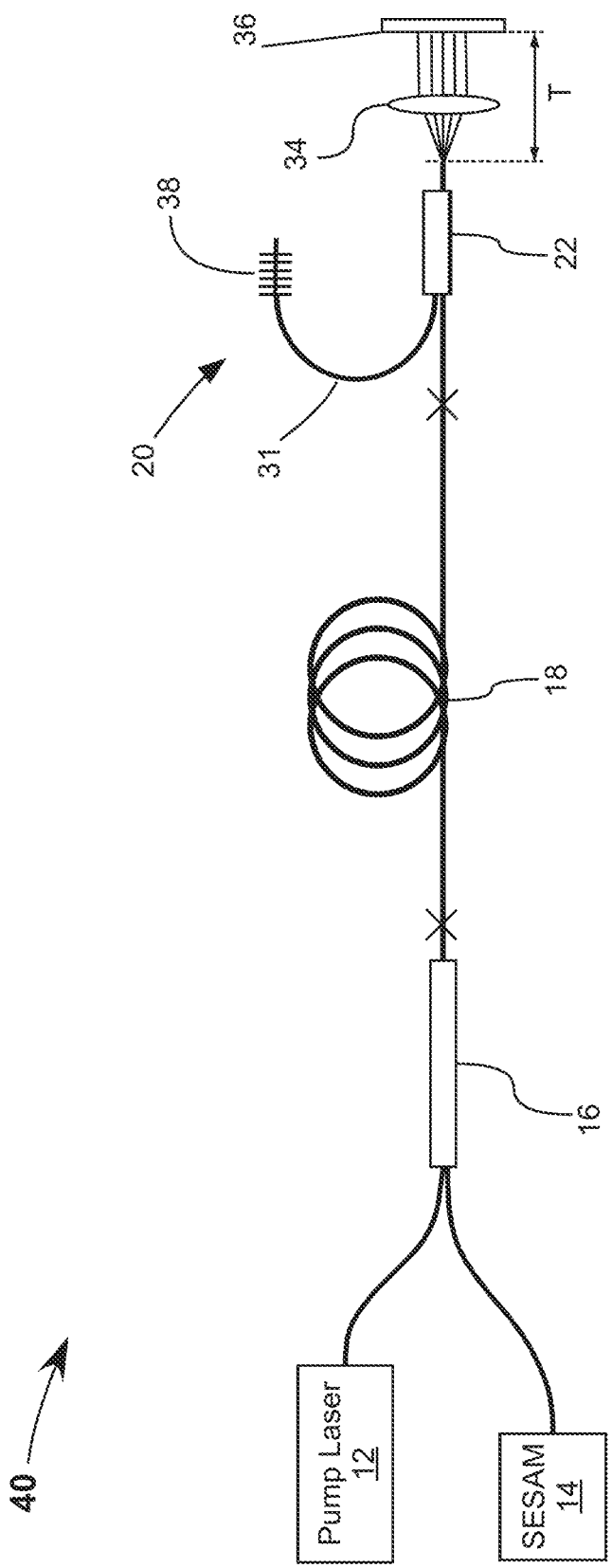
FIG. 3 schematically illustrates another embodiment of an ultrafast fiber laser according to the present invention, similar to the fiber laser of FIG. 1, but both the fiber laser resonator and the fiber branch have adjustable optical lengths.
Figure 4:
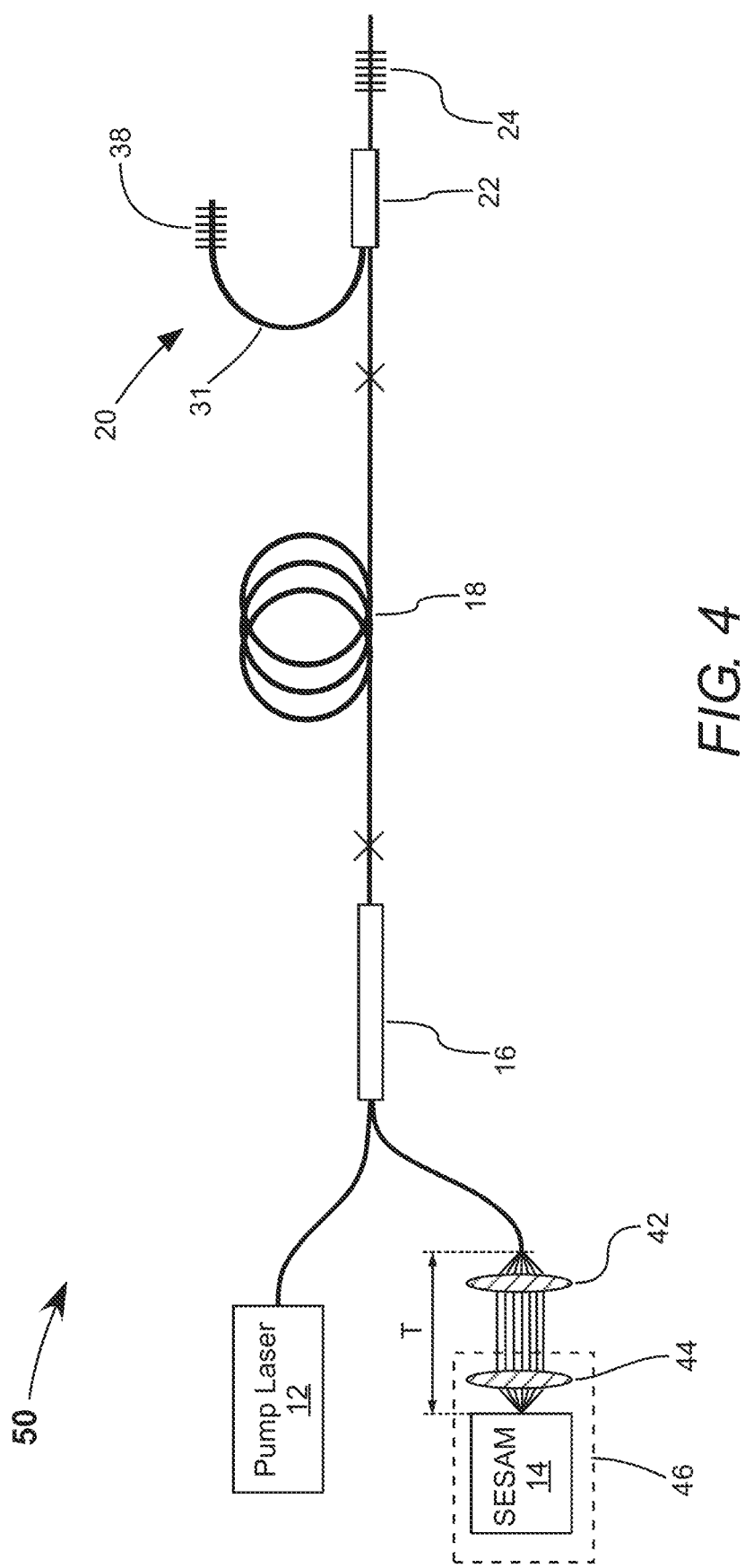
FIG. 4 schematically illustrates another embodiment of an ultrafast fiber laser according to the present invention, similar to the fiber laser of FIG. 1, but the fiber laser resonator has an adjustable optical length.

FIGS. 2-4 show the master-oscillator portion of an ultrafast laser system according to the invention. In each case, the mode-locked output laser beam from the master-oscillator may be delivered to power-amplifier 26.

FIG. 2 schematically illustrates another embodiment of an ultrafast mode-locked fiber laser 30, similar to fiber laser 10, with an exception that the optical length of the fiber branch is adjustable. Similar to FIG. 1, the SESAM 14 and the output coupling mirror 24 define each end of a linear fiber laser resonator. The fiber laser resonator has an optical length L and generates a mode-locked laser beam. A beam splitter 22 positioned in the fiber laser resonator is configured and arranged such that the mode-locked laser beam is split into first and second portions after being reflected off the output coupling mirror 24. The beam splitter 22 maybe a 2×1 50:50 beam splitter. The first portion continues to propagate in the fiber laser resonator. The second portion propagates in a fiber branch 20, which includes an optical fiber 31, a lens 28, and a highly-reflective mirror 32. The second portion returns to the fiber laser resonator through the beam splitter 22 after reflecting off the highly reflective mirror 32. The second portion propagates over an optical length C in each direction between highly-reflective mirror 32 and output coupling mirror 24.

The optical length C in fiber laser 30 is equivalent to half of optical length B in fiber laser 10. Optical length $2C=B$ is the optical length traveled by the second portion between splitting from the first portion in beam splitter 22 and the second portion next propagating through the beam splitter 22 in the same direction, i.e. after reflection from both highly-reflective mirror 32 and output coupling mirror 24. The optical length L is an integer multiple m of optical length B. Again, the output mode-locked laser beam is transmitted through the output coupling mirror 24 having a pulse repetition rate equal to the speed of light c divided by the optical length B.

The highly-reflective mirror 32 may be adjustably positioned to satisfy the condition that optical length L is an integer multiple m of optical length 2C=B. Optical length C is adjusted by translating highly-reflective mirror 32 with respect to lens 28 and the end of optical fiber 31. This translation is indicated by a double-arrowed line T in the drawing. This translation adjusts the ratio of optical length L to optical length 2C=B.

FIG. 3 schematically illustrates another embodiment of an ultrafast mode-locked fiber laser 40 according to the present invention, similar to fiber laser 30 shown in FIG. 2, with an exception that optical lengths C and L are both adjustable.

The SESAM 14 and an output coupler mirror 36 define each end of a linear fiber laser resonator. The fiber laser resonator has an optical length L and generates a mode-locked laser beam. A 2×1 50:50 beam splitter 22 positioned in the fiber laser resonator is configured and arranged such that the mode-locked laser beam is split into first and second portions after reflecting off the output coupler mirror 36. The first portion continues to propagate in the fiber laser resonator. The second portion propagates in a fiber branch 20 that includes an optical fiber 31 and a highly-reflective mirror 38, e.g. a fiber Bragg grating. The second portion returns to the fiber laser resonator through the beam splitter 22 after reflecting off the highly-reflective mirror 38.

The mode-locked laser beam propagating towards output coupler mirror 36 exits the optical fiber and is collimated by lens 34. The collimated beam is reflected by the output coupler mirror 36. C is the optical length between output coupler mirror 36 and the highly-reflective mirror 38. Again, optical length C is equivalent to half of optical length B. Optical length L is an integer multiple of optical length 2C=B. Translating output coupler mirror 36 with respect to lens 34 and the end of the optical fiber adjusts the ratio of L to B until this condition is satisfied.

FIG. 4 schematically illustrates another embodiment of an ultrafast mode-locked fiber laser 50 according to the present invention, similar to fiber laser 30 shown in FIG. 2 and fiber laser 40 shown in FIG. 3, with an exception that only optical length L is adjustable.

The SESAM 14 and the output coupling mirror 24 define each end of a linear fiber laser resonator. The fiber laser resonator has an optical length L and generates a mode-locked laser beam. A lens 42 and another lens 44 are located between the SESAM 14 and the pump coupler 16. The mode-locked beam emerging from an end of the optical fiber is collimated by lens 42 and focused by lens 44 onto SESAM 14. SESAM 14 reflects the mode-locked beam, which retraces the path through the two lenses, back into the end of the optical fiber. The collimated beam between the two lenses enables optical length L to be adjusted, by translating SESAM 14 and lens 44 with respect to lens 42 and the end of an optical fiber. It is therefore convenient to combine SESAM 14 and lens 44 into one SESAM assembly 46. Lens 44 is selected to achieve sufficient fluence on SESAM 14 to render SESAM 14 reflective when the resonator is generating mode-locked pulses.

A 2×1 50:50 beam splitter 22 positioned in the fiber laser resonator is configured and arranged such that the mode-locked laser beam is split into first and second portions after reflecting off the output coupling mirror 24. The first portion continues to propagate in the fiber laser resonator. The second portion propagates in a fiber branch 20 that includes the optical fiber 31 and highly-reflective mirror 38, e.g. a fiber Bragg grating. The second portion returns to the fiber laser resonator through the beam splitter 22 after reflecting off the highly-reflective mirror 38. The second portion propagates over an optical length C in each direction between the highly-reflective mirror 38 and the output coupling mirror 24. Again, optical length L is an integer multiple m of optical length 2C=B, with optical length L adjusted to satisfy this condition.

Although the embodiments above are described having a beam splitter 22 with a 50:50 splitting ratio, the inventive fiber laser would work for other splitting ratios, provided mode-locking can be sustained. For example, a 20:80 ratio or an 80:20 ratio or a ratio in a range between 20:80 and 80:20.

The embodiments above are described having an active gain fiber 18 located between two splices. It is convenient to fabricate the other optical components using passive optical fiber or to specify commercial components made of stock passive fiber. However, some of these components could be made of active fiber, particularly the optical fiber between the pump coupler 16 and output coupling mirror 24 or 36.

In the embodiments of FIGS. 2-4 described above, the output coupling mirror 24 or 36 is located in the linear fiber resonator and the highly-reflecting mirror 32 or 38 is located in the fiber branch. However, the inventive fiber laser would work with the functions of these mirrors exchanged, with mirror 24 or 36 being highly-reflecting and mirror 32 or 38 being partially reflecting. This alternative configuration would have the mode-locked output laser beam emerging from the fiber branch.

The present invention is described above in terms of a preferred embodiment and other embodiments. The invention is not limited, however, to the embodiments described and depicted herein. Rather, the invention is limited only by the claims appended hereto.

What is claimed is:

1. A mode-locked fiber laser comprising:
 a gain fiber;
 a pump laser generating a pump laser beam, the pump laser and the gain fiber optically coupled, the pump laser beam energizing the gain fiber;
 a semiconductor saturable absorber mirror;
 an output coupling mirror, the energized gain fiber located between the semiconductor saturable absorber mirror and the output coupling mirror, the semiconductor saturable absorber mirror and the output coupling mirror defining each end of a linear fiber laser resonator, the fiber laser resonator having an optical length L and generating a mode-locked laser beam;
 a beam splitter located in the fiber laser resonator; and
 a fiber branch coupled to the beam splitter;
 wherein the beam splitter is configured and arranged to split each pulse of the mode-locked laser beam propagating in a direction between the ends of the fiber laser resonator into (a) a first portion that continues to propagate in the fiber laser resonator, and (b) a second portion that propagates in the fiber branch before returning to the fiber laser resonator through the beam splitter, the second portion propagating over an optical length B between splitting and next propagating through the beam splitter in the same direction;

wherein optical length L is an integer multiple m of optical length B.

2. The fiber laser of claim 1, wherein the mode-locked laser beam is delivered through the output coupling mirror to a power-amplifier for further amplification.

3. The fiber laser of claim 1, wherein the output coupling mirror is a fiber Bragg grating mirror.

4. The fiber laser of claim 1, wherein the mode-locked laser beam has a pulse repetition rate equal to the reciprocal of the propagation time over optical length B.

5. The fiber laser of claim 1, wherein the mode-locked laser beam has a pulse repetition rate greater than 200 megahertz.

6. The fiber laser of claim 1, wherein the integer multiple m is in a range between 2 and 40.

7. The fiber laser of claim 1, wherein the integer multiple m is in a range between 10 and 20.

8. The fiber laser of claim 1, wherein the fiber branch is an optical fiber.

9. The fiber laser of claim 8, wherein the beam splitter is a 2×2 beam splitter, the second portion propagating in the optical fiber from a port at one end of the beam splitter to another port at the other end of the beam splitter.

10. The fiber laser of claim 1, wherein the beam splitter is a 2×1 50:50 beam splitter.

11. The fiber laser of claim 1, wherein the fiber branch includes an optical fiber, a lens, and a highly-reflective mirror.

12. The fiber laser of claim 11, wherein optical length B is adjusted by translating the highly-reflective mirror with respect to an end of the optical fiber and the lens, thereby setting a ratio of optical length L to optical length B.

13. The fiber laser of claim 1, wherein the fiber branch includes an optical fiber and a highly-reflective mirror.

14. The fiber laser of claim 13, wherein the highly-reflective mirror is a fiber Bragg grating.

15. The fiber laser of claim 13, wherein optical length L and optical length B are both adjusted by translating the output coupling mirror, thereby setting a ratio of optical length L to optical length B.

16. The fiber laser of claim 13, wherein optical length L is adjusted by translating a SESAM assembly, thereby setting a ratio of optical length L to optical length B.

17. The fiber laser of claim 1, wherein the beam splitter has a 50:50 splitting ratio.

18. The fiber laser of claim 1, wherein the beam splitter has a splitting ratio in a range between 20:80 and 80:20.

19. A mode-locked fiber laser comprising:

a linear fiber laser resonator that includes an energized gain fiber located between a semiconductor saturable absorber located at one end of the fiber laser resonator and an output coupling mirror located at the other end of the fiber laser resonator, the fiber laser resonator having an optical length L and configured to produce a beam of mode-locked laser pulses; and a fiber branch, the fiber laser resonator and the fiber branch arranged such that a mode-locked pulse propagating in the fiber laser resonator is split into (a) a first portion that continues to propagate in the fiber laser resonator and (b) a second portion that propagates in the fiber branch before returning to the fiber laser resonator, the second portion propagating over an optical length B between splitting and next propagating through the location of splitting in the same direction as when split off from the first portion;

wherein optical length L is an integer multiple of optical length B.

* * * * *